US007908595B2

(12) United States Patent
Butlin et al.

(10) Patent No.: US 7,908,595 B2
(45) Date of Patent: Mar. 15, 2011

(54) AUTOMATIC UPDATING OF VARIABLES IN A DATA LANGUAGE

(75) Inventors: Stefan Geoffrey Butlin, Cambridge (GB); Nicholas Carl Brook, Cambridge (GB); Nick Clarey, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 1323 days.

(21) Appl. No.: 11/421,382

(22) Filed: May 31, 2006

(65) Prior Publication Data

US 2006/0271845 A1 Nov. 30, 2006

Related U.S. Application Data

(60) Provisional application No. 60/686,271, filed on May 31, 2005.

(51) Int. Cl.
*G06F 9/45* (2006.01)
(52) U.S. Cl. ........................................ 717/139
(58) Field of Classification Search ................... 717/139
See application file for complete search history.

(56) References Cited

U.S. PATENT DOCUMENTS 5,917,730 A * 6/1999 Rittie et al. ........................ 703/6
2003/0110470 A1* 6/2003 Hanson et al. ................. 717/114

FOREIGN PATENT DOCUMENTS

EP 1 065 587 A 1/2001

OTHER PUBLICATIONS

Reeves W T et al: "The Menv Modelling and Animation Envirnment" Journal of Visualization and Computer Animation, XX, XX, vol. 1, No. 1, Aug. 1990, pp. 33-40, XP008068629 paragraph [04-4] p. 35, left-hand column, lines 11-15, paragraph [03.2].
Turner R et al: "An Object-Oriented Methodology using Dynamic Variables for Animation and Scientific Visualization" New Advances in Computer Graphics, Proceedings of CG International, XX, XX Jun. 29, 1990, pp. 317-328, XP008068325 paragraph [03.3].
Wikpedia.org: "Partial evaluation"[Online] Dec. 15, 2004, pp. 1-1, XP002396449 Retrieved from the Internet:URL:http://en.wikipedia.org/w/index.php?titile=Partial_evaluation&o1did=15956342> [retrieved on Aug. 24, 2006]the whole document.
Marlet R. et al: "Mapping software architectures to efficient implementations via partial evaulation" Automated Engineering, 1997. Poceedings., 12th IEEE International Conference Incline Village, NV, USA Nov. 1-5, 1997, Los Alamitos, CA, USA IEEE Comput. Soc, US, Nov. 1, 1997, pp. 183-192, XP010254946 ISBN: 0-8186-7961-1 p. 184, lines 32-39 paragraph [04.4].

* cited by examiner

*Primary Examiner* — John Chavis
(74) *Attorney, Agent, or Firm* — Nicholas A. Cole

(57) ABSTRACT

Described are various methods and apparatuses for automatic updating of variables in a data language. A dynamic variable is updated by parsing an instruction written in the data language containing the dynamic variable, creating the dynamic variable in memory, assigning a value for the dynamic variable, and updating the dynamic variable value without parsing the instruction written in the data language containing the dynamic variable. The dynamic variable may also be updated by creating an object associated with the dynamic value, wherein the object determines the value of the dynamic variable. Further, an observing a function value may be associated with the dynamic variable and then a notification is given to the object when the function value has changed.

14 Claims, 7 Drawing Sheets

AUTOMATIC UPDATING OF VARIABLES IN A DATA LANGUAGE

CROSS REFERENCE TO RELATED APPLICATION

This application claims benefit of U.S. Provisional Application Ser. No. 60/686,271, filed on May 31, 2005, the entirety of which is hereby incorporated herein by this reference.

BACKGROUND OF THE INVENTION

1. Field of the Invention

The present invention generally relates to variable processing of software applications. More particularly, the invention relates to processing dynamic variables in a data language.

2. Description of the Related Art

Data languages are becoming a more pervasive way to program. Data languages include markup languages, such as those based on XML, including HTML and TRIGML® (owned by QUALCOMM Incorporated). Data languages are extensively used in programming web-based applications but are not limited thereto. Examples of functions implemented using XML based languages include billing and transaction processing programs.

Data languages are interpretive by nature. A pass is made through the data language program and, for example, a web page is displayed using elements defined in the program. The program may define the elements used as well as characteristics of the element regarding how they may be displayed. These languages may also be used in the generation of user interfaces.

Difficulties arise in the use of data languages, such as with the handling of variables. Because XML is interpretive by nature, variables that are dynamic can't be changed once the variable has been set. Some attempts to solve this problem is with the use of java scripts. However, java scripts don't modify the variable until the code is re-executed and something must trigger the java script to be re-executed. There is no automatic trigger. In otherwords the program code containing the java script must be executed again to determine the new variable value. If the variable is dynamic and changing, the variable used in java script will not be updated until the code is re-executed.

Another difficulty in using data languages is that they don't allow access to the underlying computer or processor platform functions. For example, should you want to use a data language display a battery icon indicating the battery level, there is no mechanism in the data language to access the battery level as known to the platform. Java scripts also suffer from this problem of not having the ability to access computer/platform functions.

Consequently, there is a need in the art to provide methods and apparatus' allowing the evaluation of expressions containing dynamic variables. In addition, there is need to have a method and apparatus provide access to the computer/platform level functions.

SUMMARY OF THE INVENTION

Systems and methods consistent with the present invention overcome the shortcomings of existing systems by creating systems, methods and apparatuses that evaluate dynamic variables and access underlying functions of the computer platform.

In one embodiment of the present invention an expression having a dynamic variable written in a data language is evaluated by receiving the dynamic variable, determining a first value of the dynamic variable, evaluating the expression using the first value, and detecting a change associated with the dynamic variable. After receiving a second value associated with the dynamic variable and evaluating the expression using the second value associated with the dynamic variable; the expression is evaluated using the second value without reinterpreting other program code containing the expression.

In another embodiment, a dynamic variable is updated by parsing an instruction written in the data language containing the dynamic variable, creating the dynamic variable in memory, assigning a value for the dynamic variable, and updating the dynamic variable value without parsing the instruction written in the data language containing the dynamic variable. The dynamic variable may also be updated by creating an object associated with the dynamic value, wherein the object determines the value of the dynamic variable. Further, an observing a function value may be associated with the dynamic variable and then a notification is given to the object when the function value has changed.

In yet another embodiment an apparatus for updating a dynamic variable in a data language, comprises a memory location assigned to a dynamic variable, wherein the dynamic variable was assigned the memory location in response to parsing an instruction in a data language and a processor to evaluate updates to the dynamic variable.

In yet another embodiment a computer readable medium containing computer executable instructions for updating a dynamic variable written in a data language, that when executed performs the steps comprises parsing an instruction written in the data language containing the dynamic variable, creating the dynamic variable in memory, assigning a value for the dynamic variable, and updating the dynamic variable value without parsing the instruction written in the data language containing the dynamic variable.

Other objects, advantages and features of the present invention will become apparent after review of the herein after set forth Brief Description of the Drawings, Detailed Description of the Invention and the Claims.

BRIEF DESCRIPTION OF THE DRAWINGS

With reference to the figures in which like numerals represent like elements throughout.

DETAILED DESCRIPTION

Figure 1:
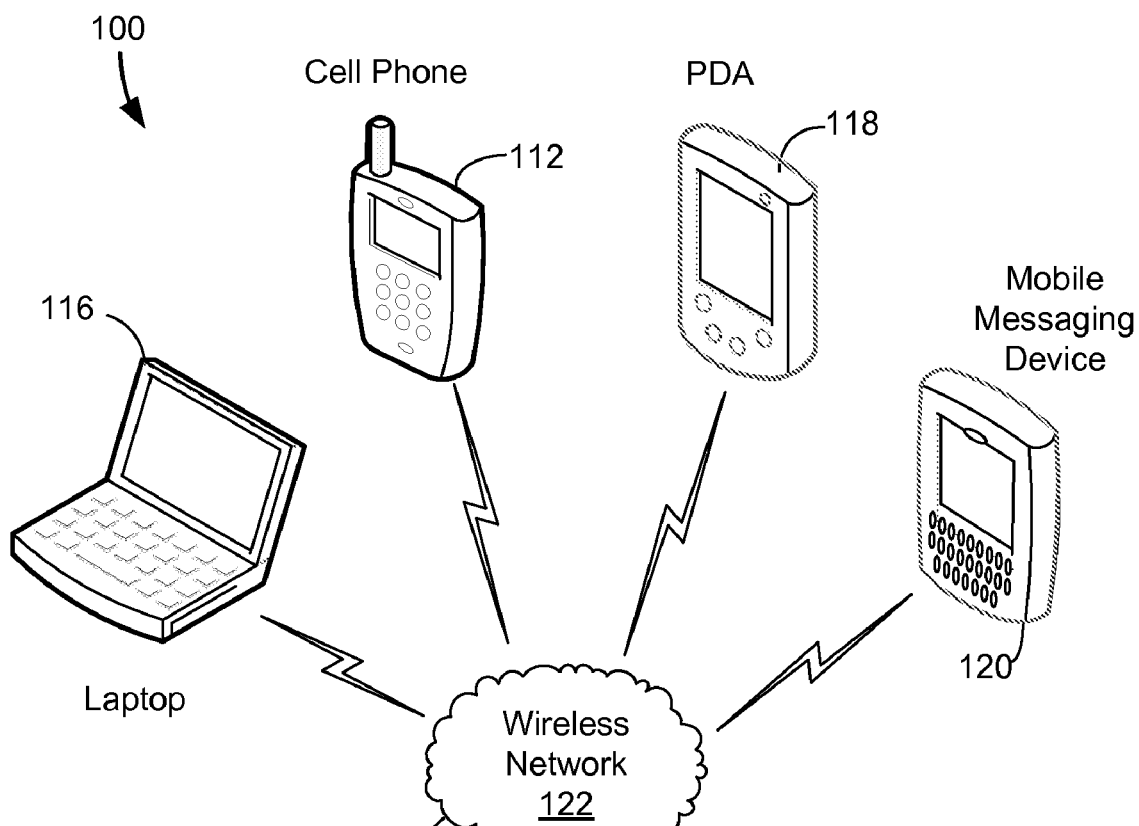
FIG. 1 is a functional diagram of a communications environment in which devices may operate in an embodiment of the present invention.
Figure 1:
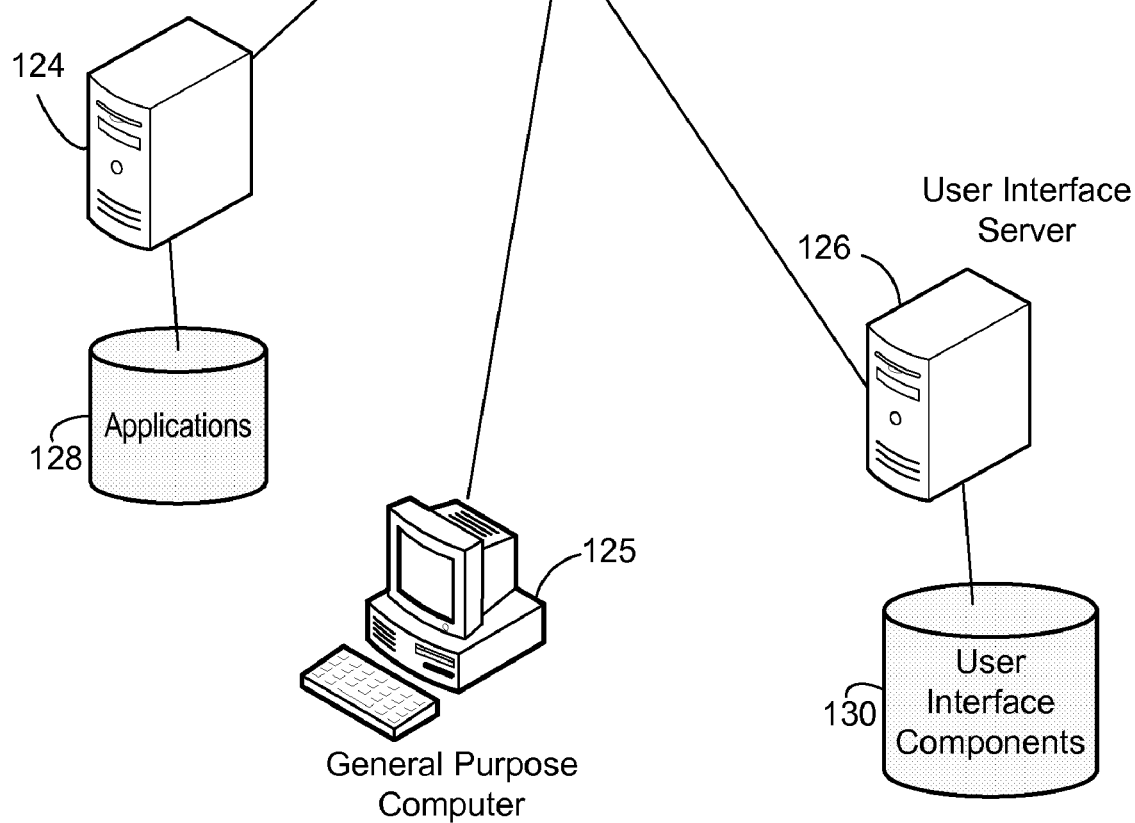

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Regarding use of terms, in this description, the terms "wireless device," "wireless telephone," and "mobile device" are used interchangeably. The term "application" as used herein is intended to encompass executable and nonexecutable software files, raw data, aggregated data, patches, content, user interfaces and user interface components, and other code segments. Further, like numerals refer to like elements throughout the several views, and the articles "a" and "the" includes plural references, unless otherwise specified in the description.

TrigML is a data driven language useful in developing User Interfaces. TrigML is a product owned by QUALCOMM Corporation. Like data languages defined under XML, TrigML code includes the use of tags. While embodiments will be described in context of TrigML for a user interface on a wireless device, it will be recognized that this is for descriptive purposes only and not a limitation on the invention. The apparatus and methods described herein are also applicable in non-user interface environments and, as stated above, in those using environments using a different data language.

FIG. 1 is a functional diagram of a communications environment 100 in which devices may operate in an embodiment of the present invention. In this example, the communications environment 100 includes a wireless network 122. The wireless network 122 may be a communications network operated by a wireless service provider to provide data or telecommunications connectivity to mobile devices. Further, the wireless network 122 may also include wired networks, the Internet, Wide Area Networks, the Public Switch Telephone Network (PSTN) and other public and/or private networks so that devices may communicate to directly or indirectly using other devices connected to these to these networks.

In one example, the wireless network 122 may include a cellular telephone network. Several mobile devices are in communication with the wireless network 122, such as a cellular phone 112, a laptop computer 116, a PDA 118, and a mobile messaging device 120. These devices are only shown as illustrative of the many types of devices that may communicate over the wireless network 122.

Illustrated in FIG. 1 are an application server 124 and a user interface server 126. The user interface server 126 is a computing device that serves user interface components 130 (described in more detail below). These user interface components 130 may be downloaded to other devices connected to the wireless network 122. User interface components include code and/or data to render a user interface (such as function calls, menus, code for content calls, skins, etc.). Note, many other servers may be used connect to the network to deliver information including content servers. The type of information that can be made available is limitless, and very many different examples will be apparent to those skilled in the art. The user interface server 126 includes server software that is configured to provide the user interface components 130 to requesting devices over the wireless network 122.

The application server 124 is a computing device or system coupled to the wireless network 122 that makes software applications 128 available for download by the mobile devices. Generally stated, the applications 128 are downloadable by the devices connected to the wireless network 122, such as the cellular phone 112, for execution on those devices. In this particular implementation, at least one of the applications 128 served by the application download server 124 is a content-based application configured for execution on at least one of the mobile devices. The content-based application (the client) is configured to retrieve content from the content server (not shown) for presentation by the mobile device via a user interface.

Figure 2:
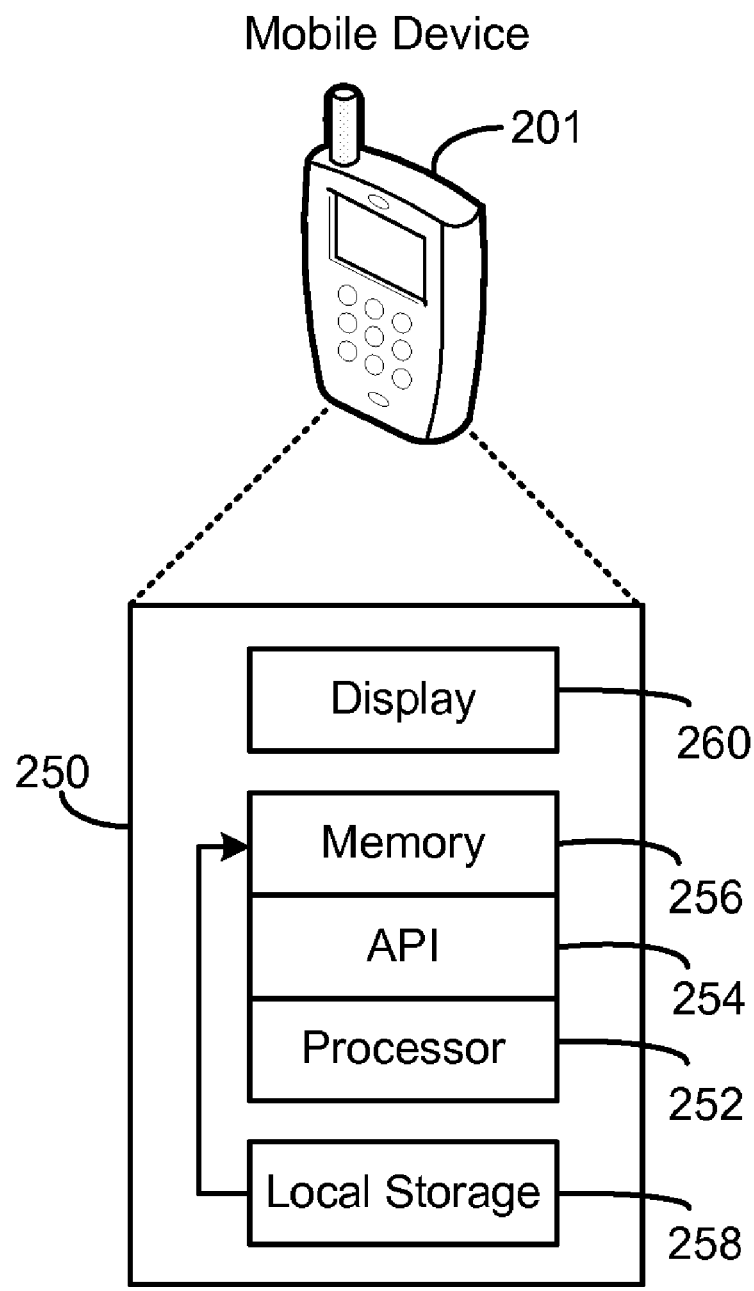
FIG. 2 is a functional block diagram generally illustrating the components of a sample mobile device in an embodiment of the present invention.

FIG. 2 is a functional block diagram generally illustrating the components of a sample mobile device 201, in an embodiment of the present invention. The mobile device 201 could be any device having computing functionality, such as a cellular telephone, a personal digital assistant, a handheld "palmtop" device, a laptop computer, a portable music player, a global positioning satellite (GPS) device, or the like.

The mobile device 201 has a computer platform 250 that can receive and execute software applications and display data. The computer platform 250 includes a processor 252, such as an application-specific integrated circuit "ASIC", digital signal processor ("DSP"), microprocessor, microcontroller, logic circuit, state machine, or other data processing device. The processor 252 executes the application programming interface ("API") layer 254 that interfaces with any resident programs in the memory 256 of the mobile device. The memory 256 can include random-access or read-only memory (RAM or ROM), EPROM, EEPROM, flash memory, or any memory common to computer platforms. The computer platform 250 also includes a local storage 258 that can hold software applications, files, or data not actively used in memory 256, such as software applications or user interface components downloaded from the user interface server 126 (FIG. 1). The local storage 258 is typically comprised of one or more flash memory cells, but can be any secondary or tertiary storage device as known in the art, such as magnetic media, EPROM, EEPROM, optical media, tape, or soft or hard disk.

The computer platform 250 also includes a display 260 that may be used by the software applications to display data using the user interface (not shown).

The components shown in FIG. 2 are typical of many types of mobile devices, but it will be appreciated that other components may be added to the mobile device 201 and in certain cases, some components shown in FIG. 2 may be omitted from the mobile device 201.

Figure 3:
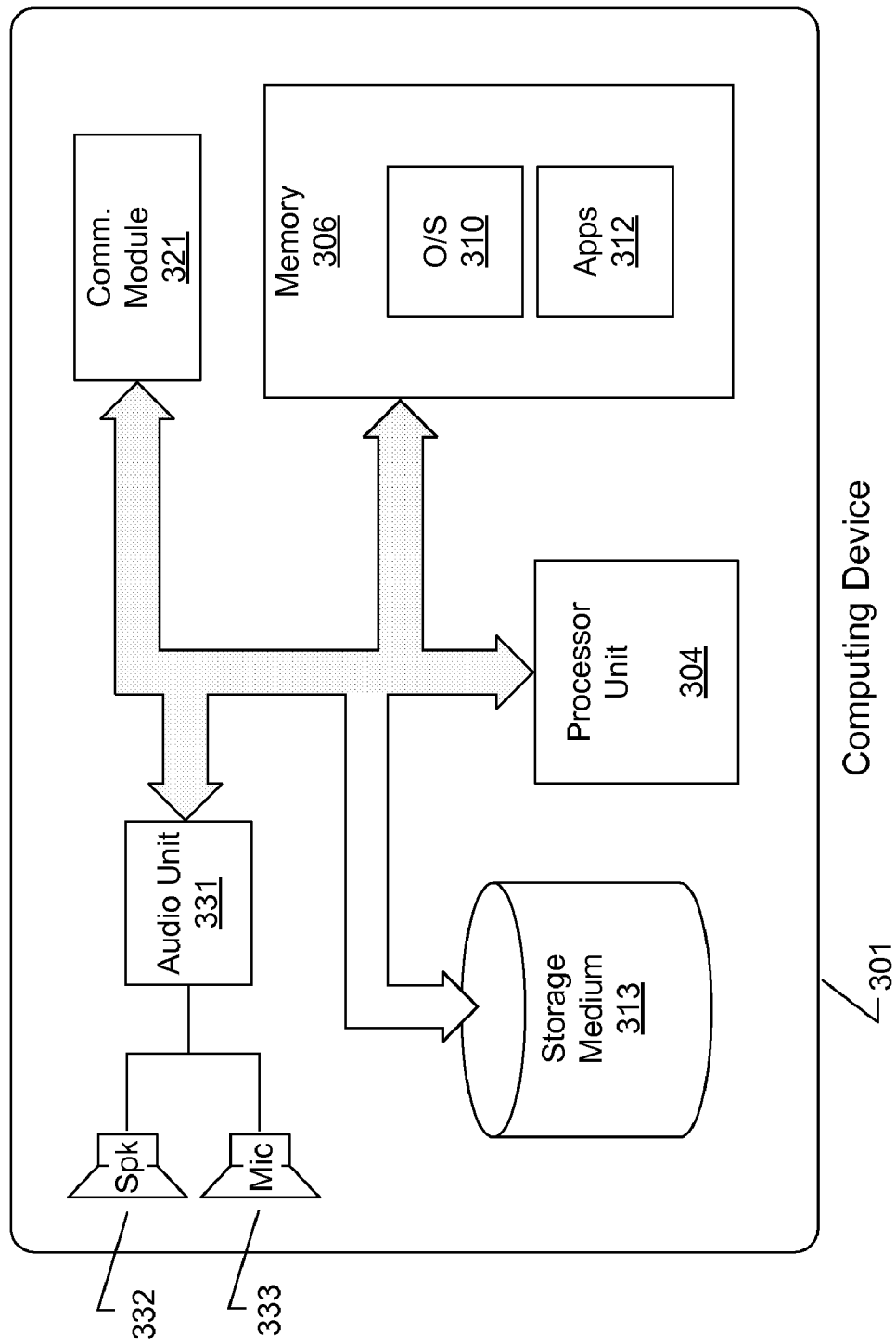
FIG. 3 is a functional block diagram generally illustrating the components of a sample computing device in an embodiment of the present invention.

FIG. 3 is a functional block diagram generally illustrating the core components of a sample computing device 301, in an embodiment of the present invention. The computing device 301 could be any fixed computing device, such as a desktop computer or server.

In this example, the computing device 301 includes a processor unit 304, a memory 306, a storage medium 313, and an audio unit 331. The processor unit 304 advantageously includes a microprocessor or a special-purpose processor such as a digital signal processor (DSP), but may in the alternative be any conventional form of processor, controller, microcontroller, or state machine. The processor unit 304 is coupled to the memory 306, which is advantageously implemented as RAM memory holding software instructions that are executed by the processor unit 304. In an alternate embodiment, the memory 306 could be composed of firmware or flash memory. In this embodiment, the software instructions stored in the memory 306 include an operating system 310 and one or more other applications 312, such as an application employing a user interface (not shown).

The mobile device 301 also includes a communications module 321 that enables bidirectional communication between the computing device 301 and one or more other computing devices, such as the mobile device. The communications module 321 may include components to enable RF or other wireless communications, such as a cellular telephone network, Bluetooth connection, wireless local area network, or perhaps a wireless wide area network. Alternatively, the communications module 321 may include components to enable land-line or hard-wired network communications, such as an Ethernet connection, RJ-11 connection, universal serial bus connection, IEEE 1394 (Firewire) connection, or the like. These are intended as non-exhaustive lists and many other alternatives are possible. The audio unit 331 is a component of the mobile device 301 that is configured to convert signals between analog and digital format. The audio unit 331 is used by the mobile device 301 to output sound using a speaker 332 and to receive input signals from a microphone 333.

FIG. 3 illustrates only certain components that are generally found in many conventional computing devices. Very many other components are also routinely found in particular implementations, and in certain cases, some components shown in FIG. 3 may be omitted. However, the computing device 301 shown in FIG. 3 is typical of the computing devices commonly found today.

Figure 4:
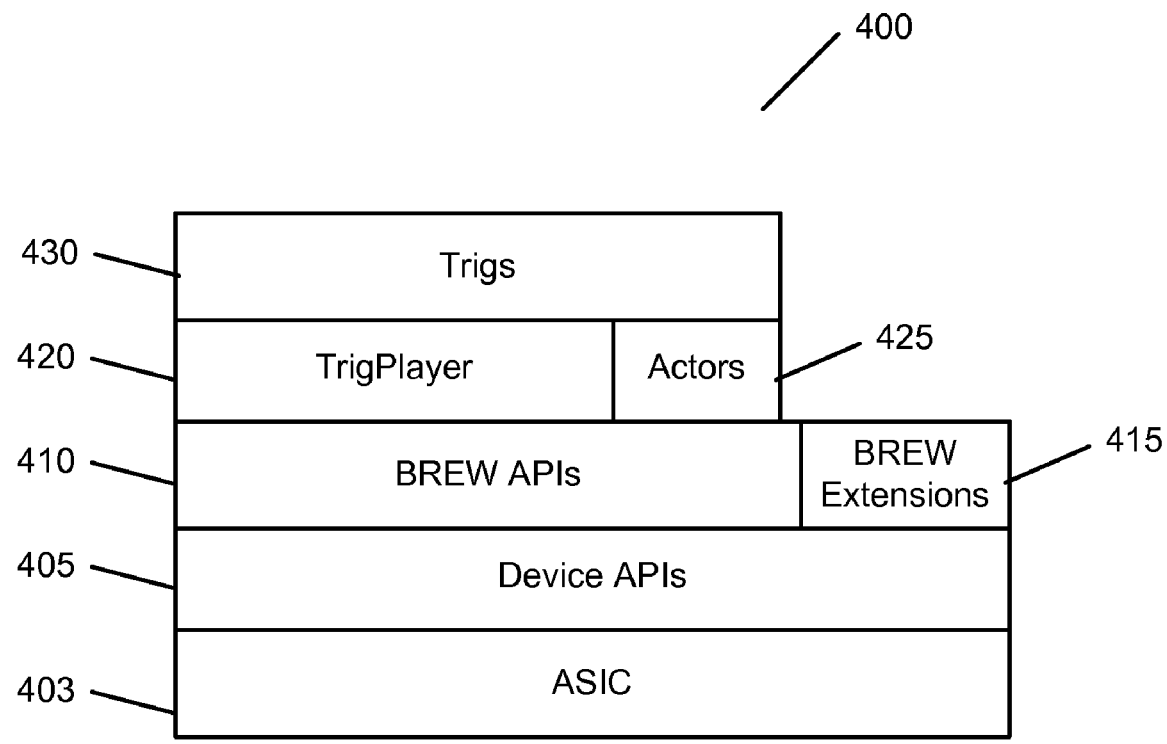
FIG. 4 is a block diagram illustrating an application architecture of a computer platform in an embodiment of the present invention.

FIG. 4 illustrates an application architecture of a device in an embodiment of the present invention. The device will include a "computer platform". A computer platform may refer to components of the device including of hardware, software or of both. For example, it may include the operating system, the underlying hardware components, including the chip, user interface hardware (e.g., displays, input and output devices), libraries, supporting APIs, additional extensions to the operating system, etc.

In one embodiment, the application architecture 400 of a wireless device includes Device APIs 405, BREW APIs 410, BREW Extensions 415, a Trigplayer 420, Actors 425, and Trigs 430. The Device APIs 405 may include those APIs used by a software platform to address functions associated specifically with that device, such as specific processor or ASIC functions, specific device hardware functionality, etc.

The BREW APIs 410 is a software platform developed by QUALCOMM Incorporated. The BREW APIs 410 provide the ability for applications to call Device APIs 405 and other functions without having to be written specifically for the device. In otherwords, it abstracts the specific aspects of the hardware from the application thereby allowing an application to be written for many devices without having to tailor, or requiring only slight tailoring, for each specific device on which the application executes.

A BREW extension 415 provides the ability to add additional capability to the BREW platform, such as offering MP3 players, Java Virtual Machines, etc.

A TrigPlayer 420, Trigs 430 and Actors 425 are components of the uiOne™ architecture developed by QUALCOMM Incorporated. These components typically refer to user interface aspects of the device 400. In one embodiment, the Trigs 430 are compiled TrigML® code, and other resources (which may include metadata, text files and images) used by an application to render a user interface on the device 400. Multiple Trigs 430 and updates to Trigs, referred to as Triglets (not shown) may be used for the user interface.

TrigML code, owned by QUALCOMM Incorporated, is a data language based on XML and may be used for user interface presentation language for authoring Trigs 430 and includes advantages of mobile-targeted functionality, an interactive user interface event model, and pixel positioning among other advantages.

Actors 425 include underlying C code to connect Trigs to underlying Device APIs 405 and/or BREW APIs 410. Actors 425 may also serve as executables for input/output. And because actors connect to the underlying Device and BREW APIs, they have access to the computer platform functions.

The Trigplayer 420 may be implemented as a BREW extension 415 even though it is separated out in FIG. 4. The Trigplayer is used to render the user interface using the Trigs and actors.

It will be recognized that although the discussion of FIG. 4 is in terms of the QUALCOMM Incorporated's uiOne architecture (including compiled TrigML, Trigplayer, BREW APIs, etc) that this is for descriptive purposes and that the present invention include other data languages, computer and software platforms and device architectures.

Figure 5:
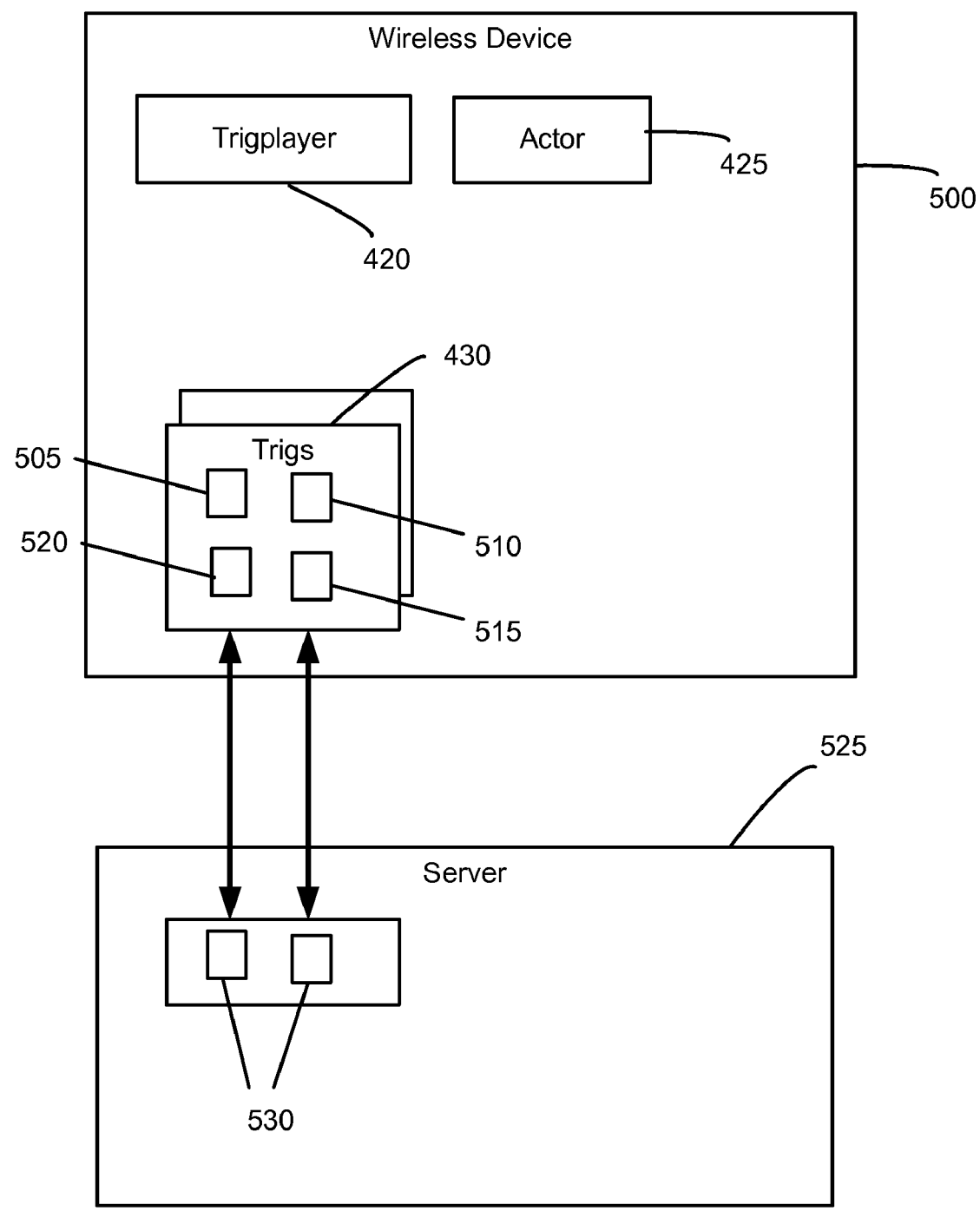
FIG. 5 is a block diagram illustrating the system of updating user interface components and an architecture depicting a trigplayer, actors and trigs in an embodiment of the present invention.

FIG. 5 is a block diagram illustrating the system of updating user interface components and an architecture depicting a trigplayer 420, actors 425 and trigs 430 in an embodiment of the present invention in an embodiment of the present invention. The device 500 includes a trigplayer 420, actors 425, and Trigs 430. The Trigs may include TrigML code 505, text strings 510, images 515 and update channels 520 (update channels may define URLs and timing schemes to fetch Triglets 530). Trigs may be updated over the air thereby allowing the user interface to be updated after the device has already left the manufacturer. A server 525 may be used to download new Trigs and or updated components of Trigs (e.g., Triglets 530) thus allowing the user interface for the device to be customized.

Figure 6:
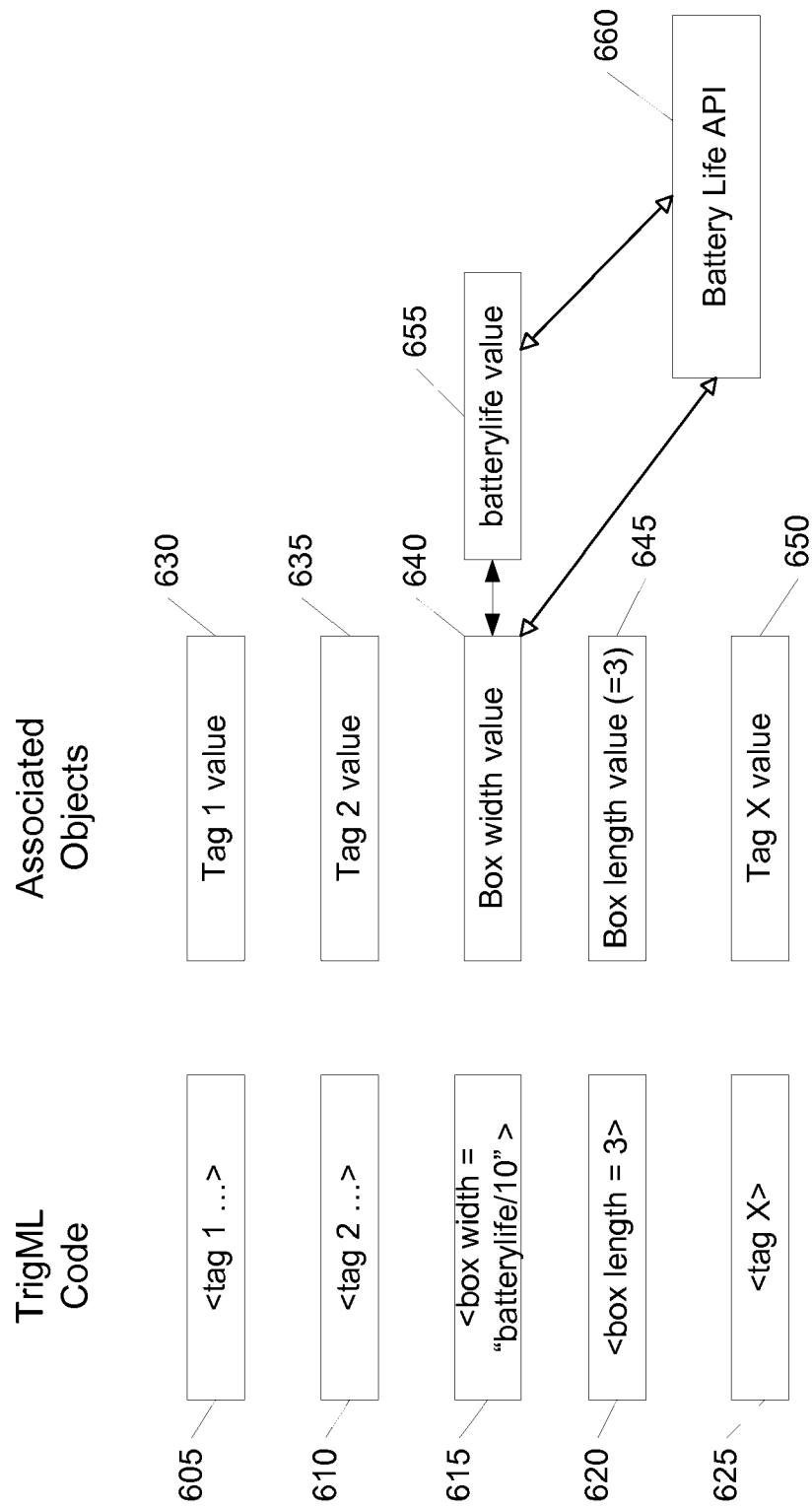
FIG. 6 is a block diagram illustrating the association TrigML code, objects and actors in an embodiment of the present invention.

FIG. 6 is a block diagram illustrating the association TrigML code, objects and actors in an embodiment of the present invention. TrigML code may be written using a series of tags (605-625). These tags may define actions to perform and define specific parameters related to the purpose of the program code. In one embodiment, this TrigML code is compiled prior to parsing and executing on a wireless device.

In one embodiment of the invention, when the TrigML program code is parsed for execution, objects associated (630-650) with elements (605-625) in the TrigML code. These objects may contain the representations of the element. For example, element 620 indicates a box having a length of 3. When this element is evaluated, an object having the value of the box length=3 (645) is created.

It may be desireable to include a dynamic variable in an expression in the program code. For example, if an icon representing a battery level for a wireless device is desired, assuming the width of box changes as the batter level changes, it is desirable to update this box width to indicate the current battery level, which is subject to change as the battery is charged and depleted.

In this case, the element "<box width="batterylife/10">" (645) contains an expression ("batterylife/10") having a dynamic variable "batterylife" that may change depending the amount of charge left in the battery. It further is manipulated by the object by dividing the batterylife value by 10. Note the expression may contain a simple or complex operation, including the use of numbers, strings, operators along with dynamic variables.

In one embodiment, an object 640 is created to determine the value of the expression of the element containing the dynamic variable. In addition, an actor 655 is created and used to receive the batterylife value. The object 640 will use the value represented in the actor for the dynamic variable in evaluating the expression.

In the device, a function, e.g., an API, monitors and determines the current batterylife (660). The function may include those functions that are at the computer or platform level to the computing device (e.g., Device and/or BREW APIs) or may be other functions of other APIs, functions, or tasks executed locally or remotely and related to the local computer or a remote computer. It will be recognized by those skilled in the art that the "batterylife" function is used for descriptive purposes only and that any function/API may be used.

Many paradigms may be used to indicate a change in the value of the batterylife function 660 to the actor 655. For example, an observe/notify pattern may be implemented in which the batterylife function 660 is told that the actor 655 exists and when a change in value occurs to notify the actor 655. Using this paradigm, the actor 655 stands by and waits for an indication from the batterylife function 660 that a change occurred. Once the actor 655 receives the indication of a change, it notifies the object 640 so the object 640 can fetch the value from the battery function 660. The object can then evaluate the expression containing the dynamic variable using the new function value.

Another paradigm includes polling, where the actor 655 periodically polls the batterylife function 660 for an indication that a change has occurred. Processing proceeds as described above where the object fetches the value of the function and evaluates the expression. Other paradigms exist and known to those skilled in the art and included in the scope of this invention.

When the object representing the expression is reevaluated, the new value can then be used for the purpose the TrigML code was written. Also notice that the dynamic variable can change often and with each change, only the object associated with the expression needs to reevaluated to determine a new value. The TrigML code is not needed to be reparsed.

Figure 7:
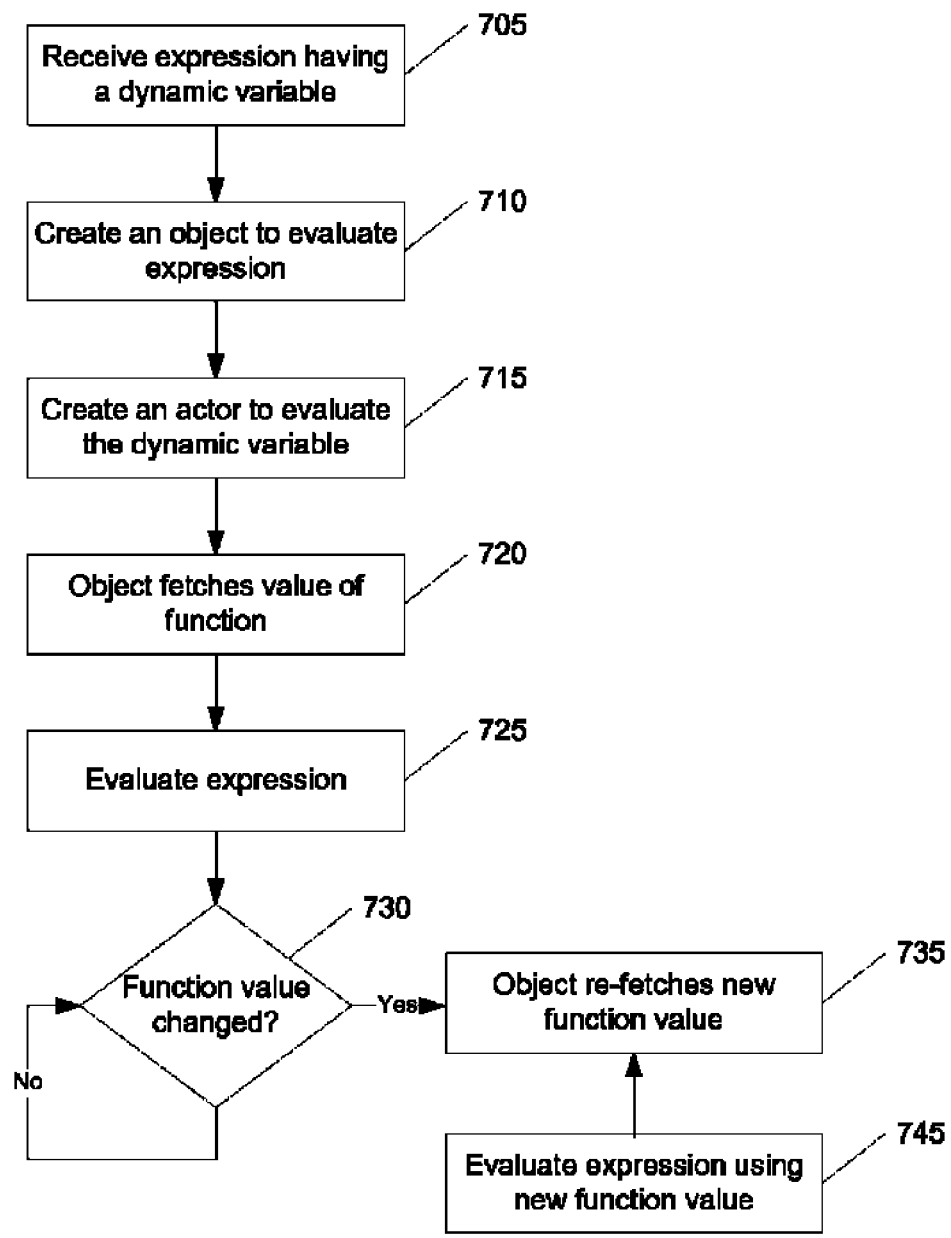
FIG. 7 is a flowchart depicting the process of evaluating a dynamic expression in an embodiment of the present invention.

FIG. 7 is a flowchart depicting the process of evaluating a dynamic expression in an embodiment of the present invention. First, the method begins by receiving an expression having a dynamic variable (Step 705). Note the expression is typically in a data language format, such as one based on XML. However other data language formats may also be used.

Also, the dynamic variable is a variable that may change and any change to it may be desired after the initial parsing of the data language program code. It may also be related to function associated with the computer platform.

Next, an object is created to evaluate the expression (Step 710). The use of an object is not necessary and may only be necessary for some elements. The object may contain the value, not necessarily a number or scalar value but the representation of the intention of the element.

An actor is then created (Step 715) which assists in providing a value of the dynamic variable. Alternatively, the actor may have already existed and the existing actor is use for informing the object that the function value has changed. The actor is linked to the function associated with the dynamic variable. The actor may provide two functions (these functions are not required to be assigned to the actor and it may perform additional functions). First, it may allow a value to be queried/fetched/read etc, and second, it may server as the mechanism to indicate a change in the function to the object (using one of the paradigms discussed herein).

The object then fetches the function value from the function (Step 720). The object proceeds to evaluate the expression (Step 725). Next, it is determined if there is a change in the function value (Step 730). This may be perform as described herein via the function indicating to the actor that a change has occurred and the actor indicating that a change occurred to the object.

If the function value changed in Step 730, the "yes path is followed and the object re-fetches the function value from the function (Step 735) and evaluates the expression using the new function value (associated with the dynamic variable) (Step 745).

If the value of the function does not change in step 730, the "no" path is followed and the function is monitored for a change using one of the paradigms described herein or others known to those skilled in the art.

Another embodiment includes updating "action" tags that rely on Boolean expressions, e.g., <animate while="valueof(/res/width)>120" . . ./>

Here the 'animate' animation tag is activated while the given boolean expression is true. If at any point in the future the expression resolves to 'false' the animation will be deactivated.

Boolean expression may also be used for one-off 'action' tags, by insisting that the tag is (instantaneously) activated each time the expression resolves to true i.e. when any sub-element of the expression is changed and the whole expression resolves to true, e.g., <doload when="valueof(/res/errormsg)='Downloaded' " . . . />

Here the 'doload' action is performed each time the VFS node/res/errormsg is updated and the expression evaluated to true.

Expression may further be embedded as resource path elements, e.g.,

<image res="res/{valueof(/var/restype)}/{valueof(/var/num)*10}" . . . />

In this embodiment the resource path of three elements is constructed using a string literal for the first element and two expressions for the final elements. The resource path indicates the location of the image to be rendered. Should any of the sub-expressions change the resource path will be automatically re-evaluated and may result in a different image being displayed.

By embedding arbitrarily complex expressions directly in XML attributes it is possible to create dynamically updatable UIs with succinct and elegant markup, without the need for events or embedded scripting languages.

The above method and software design description may also be implemented in an apparatus, stored as instructions in RAM or in other memory storage devices. Although the processes presented in this document have been illustrated and described sequentially in a particular order, in other embodiments, the steps of the processes may be performed in different orders, multiple times, and/or in parallel. Further, in some embodiments, one or more steps described in the several processes may be performed as separate steps, combined into fewer steps, or possibly omitted entirely.

While the foregoing disclosure shows illustrative embodiments of the invention, it should be noted that various changes and modifications could be made to the described embodiments without departing from the spirit and scope of the invention as defined by the appended claims. Furthermore, although elements of the invention may be described or claimed in the singular, the plural is contemplated unless limitation to the singular is explicitly stated.

What is claimed is:

1. A method for evaluating an expression, having a dynamic variable, in program code written in a data language stored in a computing device tangible storage medium, comprising:
   receiving the dynamic variable;
   creating an object associated with the dynamic value;
   determining a first value of the dynamic variable, wherein the object determines the value of the dynamic variable;
   evaluating the expression using the first value;
   detecting a change associated with the dynamic variable by observing a function value associated with the dynamic variable;
   receiving a second value associated with the dynamic variable by notifying the object when the function value has changed; and
   evaluating the expression using the second value associated with the dynamic variable; wherein the expression is evaluated using the second value without reinterpreting other program code containing the expression.

2. A method for updating a dynamic variable in a data language stored in a computing device tangible storage medium, comprising:
   parsing an instruction written in the data language containing the dynamic variable;
   creating the dynamic variable in memory;
   assigning a value for the dynamic variable;
   creating an object associated with the dynamic value, wherein the object determines the value of the dynamic variable;
   observing a function value associated with the dynamic variable;
   notifying the object when the function value has changed; and
   updating the dynamic variable value based on the changed function value without parsing the instruction written in the data language containing the dynamic variable.

3. The method of claim 2, wherein the step of assigning a value for the dynamic variable, comprises evaluating a function associated with the software platform.

4. The method of claim 2, wherein the dynamic variable is contained in a complex equation and further comprising evaluating the complex equation with the updated dynamic variable value.

5. An apparatus for updating a dynamic variable in a data language stored in a computing device tangible storage medium, comprising:
   a memory location assigned to a dynamic variable, wherein the dynamic variable was assigned the memory location in response to parsing an instruction in a data language; and
   a processor to evaluate updates to the dynamic variable, wherein the processor is configured to
      create an object associated with the dynamic value, wherein the object determines the value of the dynamic variable,
      observe a function value associated with the dynamic variable,
      notify the object when the function value has changed, and
      update the dynamic variable value based on the changed function value without parsing the instruction written in the data language containing the dynamic variable.

6. The apparatus of claim 5, wherein the memory further comprises an object associated with the dynamic variable, wherein the object receives a value representative of the dynamic variable.

7. The apparatus of claim 6, wherein the function value is based from a software platform function.

8. A computer readable medium containing computer executable instructions for updating a dynamic variable written in a data language stored in a computing device tangible storage medium, that when executed performs the steps comprising:
   parsing an instruction written in the data language containing the dynamic variable;
   creating the dynamic variable in memory;
   assigning a value for the dynamic variable;
   creating an object associated with the dynamic value, wherein the object determines the value of the dynamic variable;
   observing a function value associated with the dynamic variable;
   notifying the object when the function value has changed; and
   updating the dynamic variable value based on the changed function value without parsing the instruction written in the data language containing the dynamic variable.

9. The computer readable medium of claim 8, wherein the computer executable instructions for updating a dynamic variable written in a data language, when executed further comprises the steps of:
   creating an object associated with the dynamic value, wherein the object determines the value of the dynamic variable.

10. The computer readable medium of claim 8, wherein the computer executable instructions for updating a dynamic variable written in a data language, when executed further comprises the steps of:
    observing a function value associated with the dynamic variable; and
    notifying the object when the function value has changed.

11. The computer readable medium of claim 8, wherein the step of assigning a value for the dynamic variable, comprises evaluating a function associated with the software platform.

12. An apparatus for updating a dynamic variable in a data language stored in a computing device tangible storage medium, comprising:
    means for parsing an instruction written in the data language containing the dynamic variable;
    means for creating the dynamic variable in memory;
    means for assigning a value for the dynamic variable;
    means for creating an object associated with the dynamic value, wherein the object determines the value of the dynamic variable;
    means for observing a function value associated with the dynamic variable;
    means for notifying the object when the function value has changed; and
    means for updating the dynamic variable value based on the changed function value without parsing the instruction written in the data language containing the dynamic variable.

13. The apparatus of claim 12, further comprising:
    means for creating an object associated with the dynamic value, wherein the object determines the value of the dynamic variable.

14. The apparatus of claim 12, further comprising:
    means for observing a function value associated with the dynamic variable; and
    means for notifying the object when the function value has changed.

* * * * *